UNITED STATES PATENT OFFICE.

FREDERICK R. TAYLOR, OF NEW YORK, N. Y.

IMPROVEMENT IN FLOCKING INDIA-RUBBER GOODS.

Specification forming part of Letters Patent No. 41,453, dated February 2, 1864.

*To all whom it may concern:*

Be it known that I, FREDERICK R. TAYLOR, of the city and county and State of New York, have invented a new and improved method or process of flocking goods and articles made of india-rubber, gutta-percha, and other substance after it or they have been vulcanized, cured, or finished; and I do hereby declare that the following is a full, clear, and exact description of the manner of practicing my said invention.

The object of my invention is, as its title indicates, to "flock india-rubber goods" after it or they have been vulcanized, cured, or finished.

To accomplish this object I first take raw gum, either india-rubber or gutta-percha, and dissolve it in any of the known solvents, so as to form a cement of about the consistency of paint when prepared by the painter for use. This cement or paste I put into a reservoir of suitable construction, and in it I immerse the article I propose to "flock," so as to give it a uniform coat of the cement. The article is then "flocked" in any effectual way before the cement dries. As soon as this first coat of flock has become set, the article is covered in any effectual way with a second coat of the cement, and then with a second coat of the flock, as before. After the second coat of flock has become set, I immerse the article in nitric acid of the ordinary commercial strength for about fifteen seconds. I then immerse it in a moderately strong solution of chloride of lime-water for about thirty seconds. I then give it a second immersion in the nitric acid for about the same length of time as before, and also a second immersion in the lime-water, after which I again immerse it in the acid, and then in the lime-water for the third time the same as the first, whereupon the article is cured—that is to say, the india-rubber or cement laid on the surface of the article is vulcanized by the action of the acid and lime-water.

It will be seen that I have described the flock put on the article, and the additional rubber or cement afterward cured; but I do not deem the curing process essential in the practice of my invention. The articles or goods may be flocked and the applied rubber or cement allowed to dry without the use of the acid or lime-water, and yet produce a very satisfactory result. Indeed, I do not think that there is any practical advantage resulting from curing the rubber or cement after flocking, as the essence of my invention consists in the application of the rubber or cement and flock to the goods after it or they have been vulcanized or cured, by which a new article of manufactured india-rubber is produced.

What I claim as my invention, and desire to secure by Letters Patent, is—

1. The application of the dissolved gum or other glutinous cement and flock to the rubber or other substances after it or they have been vulcanized or cured, substantially in the manner described.

2. The vulcanizing or curing of the gum after it is applied to the vulcanized, cured, or finished rubber or other substance, substantially in the manner described.

FREDERICK R. TAYLOR.

Witnesses:
    AMOS BROADNAX,
    A. K. EATON.